United States Patent [19]

Little

[11] Patent Number: 4,478,434
[45] Date of Patent: Oct. 23, 1984

[54] HOSE MENDER DEVICE

[76] Inventor: Gerald R. Little, Rte. One, Cutler, Ill. 62238

[21] Appl. No.: 434,188

[22] Filed: Oct. 14, 1982

[51] Int. Cl.$^3$ .............................................. F16L 55/18
[52] U.S. Cl. ..................................... 285/15; 285/253; 285/370; 24/279; 24/282
[58] Field of Search .................. 285/15, 239, 253, 421, 285/258, 239, 370, 371, 397, 348, 237; 138/97

[56] References Cited

U.S. PATENT DOCUMENTS

| | | | |
|---|---|---|---|
| 633,037 | 9/1899 | Pfahler | 285/397 X |
| 3,122,383 | 2/1964 | Hirsch | 285/397 |
| 3,406,988 | 10/1968 | Jones | 285/421 X |
| 3,514,135 | 5/1970 | Cooper | 285/397 |
| 3,516,446 | 6/1970 | O'Hargan et al. | 285/239 |
| 3,700,265 | 10/1972 | Dufour et al. | 285/370 |
| 3,958,313 | 5/1976 | Rossborough | 285/237 |
| 3,960,395 | 6/1976 | Cirule | 285/370 |

FOREIGN PATENT DOCUMENTS 317843 11/1969 Sweden ............................ 285/370

Primary Examiner—Dave W. Arola
Attorney, Agent, or Firm—Haverstock, Garrett & Roberts

[57] ABSTRACT

A device for coupling adjacent ends of tubular members such as flexible tubular members comprising an elongated open ended tube member having an outside diameter that is approximately the same as the inside diameter of the tubular members to be coupled, a slit formed extending the length of the tube member forming adjacent slit edge surfaces oriented at an angle relative to the radius to the tube member thereat, a pair of aligned strap-like members having opposite ends connected respectively to the tube member on opposite sides of the slit and adjacent ends, cooperatively engagable threaded members connecting the adjacent ends of the strap-like members and adjustable in one direction to move the slit edge surfaces circumferentially relative to each other in one direction and in an opposite direction to move the slit edge surfaces circumferentially in an opposite direction relative to each other, and another threaded member operatively connected to one of the strap-like members on one side of the slit and adjustable thereon in a direction to radially deflect the slit edge surfaces relative to each other. The device may also include a sealer on at least one of the slit edge surfaces to form a seal between the surfaces when they are engaged with each, and the device may include an adjustment member connected to the tube member adjacent to the strap-like member on the one side of the slit and adjustable in opposition to the strap-like member to pull the adjacent one slit edge surface radially outwardly relative to the other slit edge surface.

10 Claims, 5 Drawing Figures

HOSE MENDER DEVICE

The present invention relates to a device for coupling adjacent ends of hose sections such as hose sections for carrying liquid and liquid-like substances. The device includes an elongated tubular member having a longitudinal slit formed therethrough along one side, and means attached to the elongated tubular member in position to bridge the slit, the bridging means including means for deflecting one of the edges of the tubular member along the slit inwardly relative to the other slit edge, and other means associated with the bridging means for drawing the slit edges into an overlapping condition to thereby reduce the cross-sectional size and diameter of the tubular member to enable the tubular member to be inserted into the ends of hose sections to be joined. The present invention also includes means associated with the bridging means whereby the tubular member can be expanded back to its original cross-sectional size and shape and retained in that condition even while inserted into hose sections so that clamping members can be positioned extending around the ends of the hose sections and tightened to sealably compress the hose sections into engagement with the portions of the tubular member that extend therein and to complete a seal between the slit edges thereof and between hose sections and the tubular member. The present invention teaches the use of a simple structural device which is relatively easy to use even under field conditions by persons having relatively little skill and using simple, readily available hand tools. The device can be used to connect together damaged hose sections to restore them to a sealed together and communicating condition, and the subject device can be made of relatively strong yet inexpensive materials so that it is not likely to be damaged in use and is not likely to be stolen for its scrap value.

It is important to provide means for making a good sealed connection between the subject coupling or mending device and the adjacent hose members to be joined, especially in systems where liquids are confined under pressure and where it is desirable to avoid even slight leakage. One of the problems with known means for coupling tubular members, including the adjacent ends of flexible and resilient tubular hose members, is the difficulty of being able to force a coupling member into the ends of the adjacent hose sections to be joined without damaging the hoses and/or the coupling member. This is especially troublesome in devices where the coupling member is a fixed member of non-varying cross-sectional size and the hose is of relatively flexible material such as rubber, reinforced rubber, certain plastic materials, and the like. The present invention overcomes the problems associated with such constructions by teaching the construction of a tubular coupling member that can have its cross-sectional size controllably reduced to facilitate insertion into the hose sections to be joined and thereafter enlarged to engage the inner surfaces of the hose sections and to enable the hose sections and the tubular member to be sealed to each other in a closed and leakproof condition.

Among the more pertinent known prior art constructions are the constructions shown in Jones U.S. Pat. No. 3,406,988 and in Rossborough U.S. Pat. No. 3,958,313. These patents disclose devices for joining adjacent ends of hose sections in which one end of the hose mending or coupling device is inserted into the end of one of the hoses or pipe sections and the other end of the coupling device is placed over or around the outer surface of the second hose or pipe section to be joined. These patents are of general interest in that they show the use of clamping rings and coupling members having external grooves which cooperate for sealably engaging hose sections to the coupling member, but neither of the patented constructions discloses the use of a coupling device which is capable of being controllably contracted in order to be inserted into hose sections and thereafter expanded into engagement with the hose sections to be coupled thereby. Other patents of general interest are U.S. Pat. Nos. 633,037; 3,514,135; 3,516,446; and 3,960,395.

It is a principle object of the present invention to teach the construction of a novel hose coupler or hose mender device that is relatively simple and easy to use and which can be used to sealably join adjacent ends of hose members including flexible hose members.

Another object is to provide a relatively inexpensive hose coupling device which can be operated using relatively simple available hand tools.

Another object is to provide a hose coupling device which can be accurately installed by persons having relatively little skill and training.

Another object is to provide means for maintaining a reduced cross-sectional size for a tubular coupler member to enable it to be easily inserted into hose or tube-like members to be coupled without damage thereto.

Another object is to teach novel means for sealably reclosing a tubular coupling member.

Another object is to provide improved means for sealably connecting adjacent ends of tubular members including flexible resilient tubular members.

These and other objects and advantages of the present invention will become apparent to those skilled in the art after considering the following detailed specification of several embodiments of the subject device in conjunction with the accompanying drawings, wherein.

Figure 1:
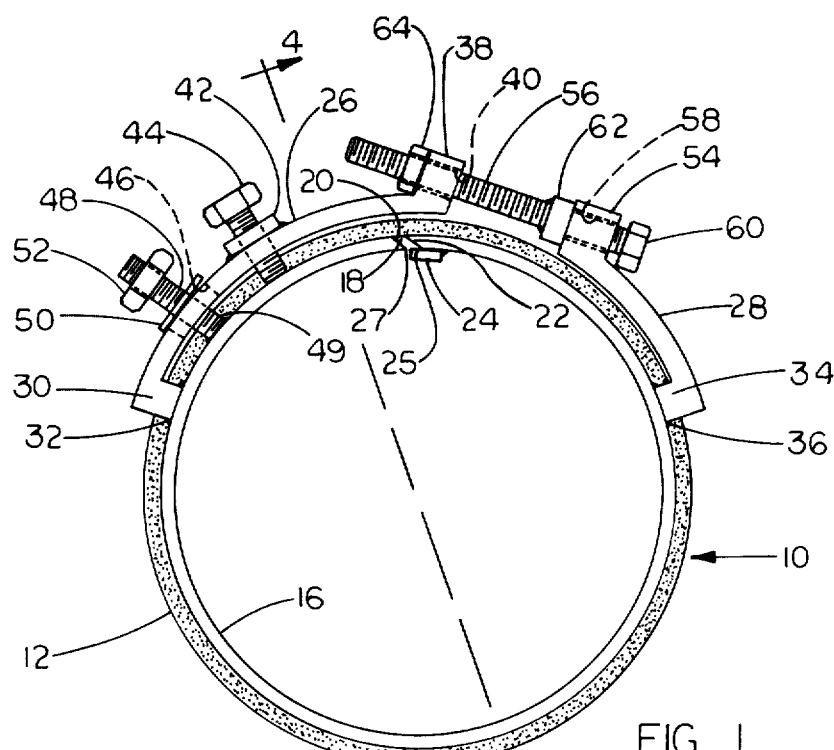
FIG. 1 is an end view of a tubular coupling device constructed according to the present invention with a section of hose member mounted thereon, said view showing the subject tubular coupling member in a partly expanded condition prior to or immediately after being contracted.
Figure 2:
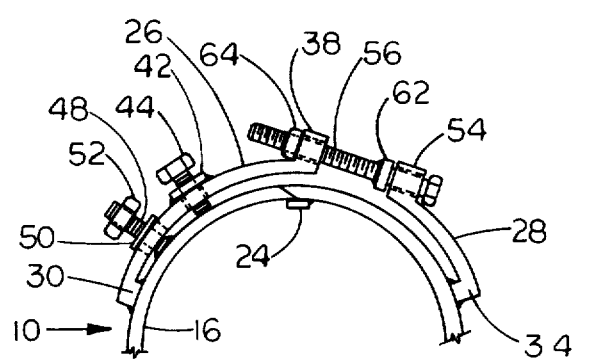
FIG. 2 is a fragmentary end view of the coupling device of FIG. 1 showing the device in closed condition.
Figure 3:
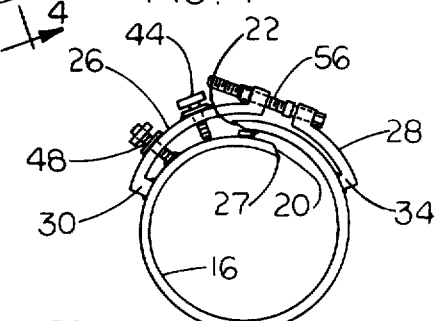
FIG. 3 is an end view of the coupling device of FIG. 1 shown in a contracted position for inserting into the end portions of hose members to be coupled thereby.
Figure 5:
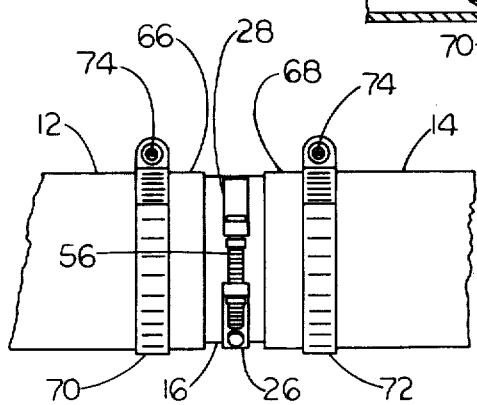

Referring to the drawings more particularly by reference numbers, number 10 in FIG. 1 identifies a coupling device for coupling two adjacent hose members such as the hose members 12 and 14 shown in FIG. 5. The coupling device 10 includes an open-ended tubular member 16 having an outside diameter that is approximately the same as the inside diameter of the tubular hose members 12 and 14 to be coupled, and the tubular member 16, as shown in FIG. 1, has a longitudinal slit 18 formed therethrough extending the length thereof along one side. It is preferred that the slit 18 be formed at an acute angle relative to the radius of the tubular member 16 at the location thereof as shown for reasons which will be explained hereinafter. The slit 18 is formed by opposed edge surfaces 20 and 22, and the tubular member 16 is preferably formed of some relatively strong but resilient material such as steel or stainless steel although it is anticipated that other materials such as certain plastics may be used in some situations. A rod member 24 shown of rectangular cross-sectional shape, is welded or otherwise attached extending along the tube slit edge 22 on one side thereof as shown in FIG. 1 to form a V-shaped groove 25 which is shaped to receive and accurately locate the tapered edge portion 27 formed by the other slit edge surface 20 and the adjacent side wall of the member 16.

Attached to the outer surface of the tubular member 16 at an intermediate location along the length thereof and in position spanning the slit 18 is a strap construction including a first strap member 26 and an aligned second strap member 28. The straps 26 and 28 are preferably relatively rigid members. The first strap member 26 has one end portion 30 that is welded at 32 to the outer surface of the tubular member 16 at a location spaced from one side of the slit 18, and the strap member 28 has one of its end portions 34 welded at 36 to the outside surface of the tubular member 16 on the opposite side of the slit 18. Alternatively, it is possible to form the two strap members into a one-piece detachable construction extending around the circumference of the device in order that the strap construction can be removable and reusable but if this is done it must be welded or otherwise made secure to the tubular member on opposite sides of the slit 18 for reasons that will become apparent. The strap members 26 and 28 are in alignment circumferentially on the tubular member 16, as aforesaid, and the opposite or free end of the strap 26 has an outwardly extending portion 38 with an opening 40 therethrough. The strap 26 also has a threaded nut 42 or like means welded to its outer surface at an intermediate location between the ends thereof and preferably relatively close to one side of the slit 18. A threaded member or bolt 44 extends through the nut 42 and through a similarly threaded opening formed in strap 26, and the bolt 44 can be turned using a wrench into engagement with the outer surface of the tubular member 16 adjacent to one side of the slit 18 and at a location that is spaced from where the strap 26 is welded to the tubular member. This is so that when the threaded member 44 is threaded into the nut 42 and against the outer surface of the tubular member 16 and turned further it will bear against and deflect the free slit edge surface 20 of the tubular member 16 inwardly relative to the opposed slit edge surface 22 on the opposite side of the slit 18 to lap the edges 20 and 22. This will be explained more in detail hereinafter.

The strap 26 also has an elongated opening 46 formed therethrough at an intermediate location between the threaded member 44 and the welded end portion 30. A threaded stub member 48 has one of its ends 49 welded to the other surface of the tubular member 16 or otherwise attached thereto in position to extend outwardly through the enlarged opening 46. A washer 50 and a threaded nut 52 are positioned on a threaded member 48 and when the nut 52 is tightened on the member 48, it will bear against the outer surface of the strap 26 to pull the portion of the tubular member 16 adjacent to the slit surface 20 outwardly in order to bring the edge surfaces 20 and 22 into alignment for reasons which will become apparent. This is done when the threaded member 44 has been backed off.

The strap member 28 has a tubular end portion 54 which is substantially in alignment with the opening 40 formed in the end portion 38 of the strap 26. A threaded member 56 is positioned extending through bore 58 in the tubular end portion 54 and also through the opening 40 in the end portion 38 of the strap 26. The threaded member 56 has a hexagonal head portion 60 which abuts the end of the tubular portion 54, and an annular member or nut 62 is welded or otherwise fixedly positioned on the threaded member 56 at a location closely adjacent to the tubular portion 54 but on the opposite side thereof from the hex head 60. This means that the threaded member 56 is able to rotate freely relatively to the bore 58 in the tubular portion 54 but is not able to be removed from the bore passage 58. The free end of the threaded member 56 extends through a threaded nut member 64 which is welded or otherwise fixedly attached to the end portion 38 on the strap 26. The opening through the portion 38 may also be threaded. By tightening on the head portion 60 in one direction using a wrench the threaded member 56 will turn in the nut 64 to thereby shorten the distance between the members 38 and 54. This is done in several different relative positions of the edges 20 and 22 including when the edge 20 is deflected inwardly relative to the edge 22 and relative to the rod 24 as aforesaid to lap the edge portions of the tubular member 16 and to thereby reduce the cross-sectional size of the tubular member 16. The same procedure can be used where the edges 20 and 22 are in circumferential alignment to reclose the tubular member 16 as will be explained. On the other hand, if the head 60 is turned in the opposite direction eventually the stop member 62 will move against and engage the adjacent end of the tubular portion 54 such that any additional turning of the threaded member 56 in the same direction will cause the end portion 38 of the strap 26 to be pushed away from the end portion 54 of the strap 28. This will gradually move the slit edges 20 and 22 away from each other and will aid in moving them back towards circumferential alignment. This should be done when the threaded member 44 which deflected the edge portion 27 inwardly has been backed off. Should the turning of threaded member 56 be inadequate to return slit edges 20 and 22 to substantially circumferential alignment, additional means are provided to accomplish this purpose by pulling edge portion 27 outwardly. Threaded nut 52 is used for this purpose. The nut 52 is positioned on the threaded member 48 which has one end welded or otherwise fixedly attached to the tubular member 16 as stated. When the nut 52 is tightened on member 48 against the washer 50 and the strap 26 any further turning of the nut 52 will result in the inwardly deflected tube portion adjacent to the slit edge surface 20 thereof being pulled outwardly and this continues until the slit edge surfaces 20 and 22 are restored to substantially circumferential alignment. The consequences of turning the threaded member 56 and the nut 52 in the manners indicated restores the tubular member 16 to its original round condition engaging the tubular member 16 with the inner surfaces of the tubular members or hoses 12 and 14 to be joined. In an actual situation where flexible relatively resilient hoses 12 and 14 are to be coupled, the slit edge surfaces 20 and 22 will necessarily move very close to each other because generally it will not be possible to stretch the hoses to any substantial extent when installing the subject coupler.

However, only the slightest clearance is usually required to make the connection and the spacings between the surfaces 20 and 22 as shown in the drawing have been exaggerated intentionally to make the operation clear.

It is usually preferred to coat the slit edge surfaces 20 and 22 and the surfaces adjacent thereto including the adjacent surface on the rod member 24 with a sealer material such as a rubbery or elastic material which will enable the surfaces 20 and 22 when they come together to become sealably engaged. It is important to establish such a sealed condition when the device is installed to prevent leakage between the slit edges 20 and 22.

Figure 4:
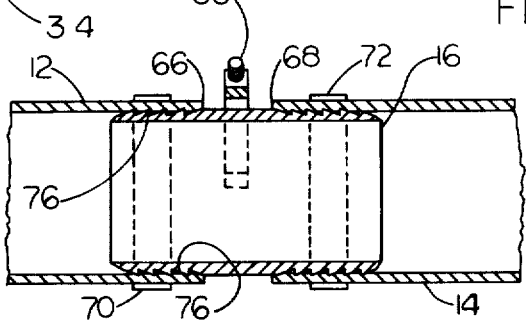
FIG. 4 is a cross-sectional view taken along line 4—4 of FIG. 1 showing two hose members to be coupled mounted thereon; and, FIG. 5 is a side elevational view showing two adjacent hose sections coupled by coupling means constructed according to the present invention.

As shown in FIG. 4, the tubes 12 and 14 have their respective end portions 66 and 68 mounted on opposite ends of the tubular member 16. The tubes, including the end portions 66 and 68, are preferably constructed of a relatively flexible resilient material such as a rubber or rubber-like material, a re-enforced rubber or rubber-like material, a flexible plastic material or some other material having these characteristics. One of the problems in the past in coupling such tubular members together involved the difficulties encountered in trying to force the coupling means used into the tube ends, and this resulted largely because of the fact that the coupling members that were used had to be forced or driven inwardly into the tube ends. Damage often resulted to the tube ends when this was done, especially if a relatively stiff hard coupling member had to be forced into the ends of members or hoses that were of much softer and more flexible material. Also generally there was no known way to support the flexible tubes while the coupling member was forced into the tube ends. Furthermore, even if the coupling member was able to be forced into the tube ends it often resulted in some distortion or stretching of the tubes and this condition caused later troubles when the tubes were clamped to the coupling members. To overcome these difficulties other prior art devices were developed wherein the ends of the coupling members were tapered to facilitate inserting them into the tube ends. However, after the coupling member had been moved into the tubes to a certain point they had to be forced the rest of the way with great difficulty and by means which often resulted in some tube stretch and other tube damages. All of the known prior art couplings are not only difficult and time consuming to install but do not result in satisfactory coupling devices. Furthermore, even under the most ideal circumstances forcing a rigid member into a flexible tube member results in some scuffing, scraping, curling or other like damage which means that when clamps are later applied to the outer surface of the tubular members to complete the connection something less than the most ideal sealed condition results and the clamps themselves are likely to result in further damage to the tubes and can create other problems as well. In order to make a good sealed connection between a rigid coupling member and flexible, resilient and somewhat stretchable tube members, it is therefore important to be able to accurately and precisely position the coupling member in the tube ends in a relatively free and unstressed condition by being able to insert the coupling member into the tubes when in a contracted condition and enlarging the coupler after insertion in order to expand it outwardly into seated engagement with the tubular members to be joined. The present invention teaches the construction and operation of unique and novel coupling device which can accomplish these things and in a simple and expeditious manner while requiring only relatively simple and readily available hand tools.

When the present coupling member 16 has been installed in adjacent tube ends, clamping means such as one or more conventional type circular clamping devices 70 and 72 as shown in FIG. 5 are attached extending around the outer surfaces of the tube ends to clamp the tube ends to the coupling device on opposite sides of the straps 26 and 28. The clamping devices 70 and 72 can also be put in position extending loosely around the outer surfaces of the tube ends 66 and 68 prior to the time when the ends of the coupling member 16 are inserted into the adjacent tube ends but the clamping devices are not to be tightened about the tube ends and coupling device until after the coupling device has been properly installed in the tube ends. It is important in using the present device that when the clamping devices are positioned extending around the outer surfaces of the tube ends 66 and 68 into which the coupler has been inserted and the clamping devices are thereafter tightened to seal the tube ends to the coupling member, that the force used to do so also be in a direction to produce a sealed condition between the slit edges 20 and 22 of the tubular member 16. The result therefore of utilizing the clamping devices is to both seal the coupling device to the tube ends and to seal the slit edges to each other. This means that in the final assembly the straps 26 and 28 and their associated parts are no longer required unless, of course, the tubular member 16 is to be removed for later use. Thus, the straps 26 and 28 can be removed and used elsewhere as required. This may be difficult, however, if the straps are welded to the tubular member 16 as in the preferred embodiment. For some cases it may be possible to attach the strap to the tube by means other than by welding and in such cases they can be removed. The clamping devices 70 and 72 may be of many different constructions including the constructions shown in FIG. 5 as well as others. For example, the clamping devices can include threaded members 74 which cooperate with threaded means on the clamping devices, and various known forms of the threaded means can be used for this purpose. It is also generally preferred that the outer surfaces of the tubular member 16 on both sides of the straps 26 and 28 be grooved as by spaced V-shaped grooves 76 as shown in FIG. 4 to increase the sealing action when the clamping devices 70 and 72 are tightened and to minimize the possibility of the tubes pulling loose from the coupling member 16.

Thus there has been shown and described several embodiments of a novel hose mender or coupling device for use in joining or coupling adjacent flexible resilient hose members or pipe sections which device fulfills all the objects and advantages sought therefor. It will be apparent to those skilled in the art, however, that many changes, modifications, variations, and other uses and applications for the subject device are possible. All such changes, modifications, variations and other uses and applications which do not depart from the spirit and scope of the invention are deemed to be covered by the invention which is limited only by the claims which follow.

What is claimed is:

1. Means for coupling adjacent ends of relatively flexible tubular hose members comprising an elongated open ended tubular member formed of relatively rigid but somewhat resilient material, a slit formed through the member extending the length thereof along one side, said slit being formed by adjacent complimentary edges angularly oriented relative to the radius of the tubular member thereat, an elongated member attached to the tubular member adjacent to one of the slit side edges and extending therealong to form a groove with the adjacent slit side edge of a shape to cooperatively receive and support the other slit edge, strap means attached to the tubular member intermediate the ends thereof in position to span the slit, first means on the strap means operable to controllably move one of the slit edges radially inwardly relative to the other, second means on the strap means operable to contract the tubular member by lapping the tubular member adjacent to the slit to enable it to be positioned extending in the ends of tubular hose members to be coupled, and third means on the strap means operable to expand the tubular member into engagement with the hose members into which the tubular member is inserted, said strap means including first and second circumferentially aligned strap members attached respectively to the tubular member on opposite sides of the slit.

2. The coupling means of claim 1 including clamp means for positioning extending around the hose members on opposite sides of the strap members, said clamp means including means adjustable to clamp the respective hose end portions to the tubular member and to press the slit edges into engagement with each other along the length thereof.

3. The coupling means of claim 1 wherein at least one of the slit edges is coated with a relatively compressible sealer material.

4. The coupling means of claim 1 wherein said third means includes a threaded member attached to the outer surface of the tubular member at a location spaced from said one side of the slit and adjacent to one of the strap members, and means threadably engagable with said threaded member and with said one strap member, said means being threadably adjustable on the threaded member to pull on the inwardly deflected portion of the tubular member outwardly so as to circumferentially align the slit edges.

5. The coupling means of claim 1 wherein the first and second strap members are elongated members having opposite ends fixedly attached to the tubular member and adjacent ends spaced from each other, and wherein said second means connects the adjacent strap ends and includes threaded means adjustable to change the spacing between the adjacent strap ends.

6. A coupling device for coupling adjacent ends of relatively flexible members comprising
an open ended tubular member having a slit formed therethrough extending the length thereof,
means attached to the tubular member including a first portion attached to the tubular member on one side of the tube slit and a second portion attached to the tubular member on the opposite side of the slit,
means connecting the first and second portions including threaded means operable in one direction to draw the first and second portions toward each other and in another direction to push the first and second portions away from each other,
other threaded means on the first portion adjustable into engagement with the tubular member adjacent one side of the slit, said other threaded member being adjustable on said first portion to move the slit edge adjacent thereto radially inwardly relative to the other slit edge whereby the threaded means connecting the first and second portions can be operated in said one direction to move the portions of the tubular member adjacent to the slit into a lapped condition to reduce the cross sectional size of the tubular member to facilitate inserting the tubular member into the ends of relatively flexible members to be coupled.

7. The coupling device of claim 6 including an elongated threaded member having one end fixedly attached to the tubular member adjacent to said one side of the slit and to the first portion, and means threadedly engagable with the elongated threaded member and adjustable against the first portion, said threaded means being adaptable to pull the tubular member adjacent to the one side of the slit radially outwardly to align the slit edges.

8. Means for coupling adjacent ends of flexible conduits to form a sealed connection therebetween including an elongated substantially tubular member having a slit therethrough extending the length thereof, said slit being defined by adjacent edge surfaces angularly oriented relative to the radius of the tubular member thereat, the outside diameter of the tubular member being substantially the same as the inside diameter of the flexible conduits to be coupled, spaced means connected to the tubular member on opposite sides of the slit and at a location intermediate the ends thereof, said means including a first elongated member having opposed ends one of which is fixedly attached to the tubular member on one side of the slit and a second elongated member which is in alignment with the first elongated member and has opposed ends one of which is fixedly attached to the tubular member on the opposite side of the slit from the first elongated member, said first and second elongated members having adjacent ends, means connecting the adjacent ends including means to adjust the spacing therebetween and the relative circumferential positions of the slit edge surfaces, means adjacent one of said elongated members movable into engagment with the tubular member on one side of the slit, said means being adjustable to deflect the adjacent slit edge surface radially inwardly relative to the other slit edge surface whereby the means connecting the adjacent ends of the first and second elongated members can be adjusted to move portions of tubular member adjacent to the slit into overlapping relationship, and other means attached to the tubular member adjacent to the one side of the slit and to said one elongated member, said other means including means adjustable to move the inwardly deflected portion of the tubular member outwardly to establish circumferential alignment between the slit edge surfaces.

9. The coupling means defined in claim 8 including means attached to the elongated tubular member adjacent to one of the slit edge surfaces to form a channel therewith for cooperatively receiving the tubular member adjacent the other slit edge surface for aligning the slit edge surfaces.

10. The coupling device of claim 8 wherein at least one of the slit edge surfaces is coated with a sealer material.

* * * * *